United States Patent [19]

Binder

[11] 4,055,778
[45] Oct. 25, 1977

[54] GENERATOR HOUSING
[75] Inventor: Georg Binder, Stuttgart, Germany
[73] Assignee: Robert Bosch G.m.b.H., Stuttgart, Germany
[21] Appl. No.: 610,404
[22] Filed: Sept. 4, 1975

Related U.S. Application Data

[63] Continuation-in-part of Ser. No. 434,587, Jan. 8, 1974, which is a continuation of Ser. No. 273,189, July 19, 1972, abandoned.

[30] Foreign Application Priority Data

Aug. 5, 1971 Germany .................. 7129982[U]

[51] Int. Cl.$^2$ .............................................. H02K 5/00
[52] U.S. Cl. .................................................. 310/89
[58] Field of Search ................ 310/263, 68, 169, 89, 310/680, 91, 166, 171; 322/47; 123/195 A

[56] References Cited

U.S. PATENT DOCUMENTS

| 3,252,025 | 5/1966 | Brown | 310/263 |
| 3,253,167 | 5/1966 | Bates | 310/263 |
| 3,271,606 | 9/1966 | Collins | 310/263 |
| 3,305,740 | 2/1967 | Shano | 310/263 |
| 3,538,362 | 11/1970 | Cheetham | 310/89 |
| 3,548,226 | 12/1970 | Sato | 310/263 |

FOREIGN PATENT DOCUMENTS

| 1,531,783 | 7/1968 | France | 310/263 |

Primary Examiner—R. Skudy
Attorney, Agent, or Firm—Michael J. Striker

[57] ABSTRACT

A generator housing has a cast cup-shaped member which has an axis and an open end closed by a bearing plate. A cylindrical portion of the cup-shaped member is provided with three protuberances angularly spaced 120° apart from each other about the axis of the cup-shaped member. Each protuberance extends the entire axial length of the cylindrical portion of the cup-shaped member and is provided with a longitudinal passage therethrough to receive through-bolts for holding the housing in a predetermined position. The bearing plate is formed with through openings aligned and communicating with the passages, the through-bolts also passing through the respective openings.

10 Claims, 2 Drawing Figures

GENERATOR HOUSING

CROSS-REFERENCE TO RELATED APPLICATIONS

This is a continuation-in-part of my application Ser. No. 434,587 filed Jan. 8, 1974 as a continuation of an application Ser. No. 273,189, filed July 19, 1972, now abandoned.

BACKGROUND OF THE INVENTION

The present invention relates to generators, and more particularly to a generator housing for a claw-pole generator primarily intended for use in motor vehicles.

It is well known that equipment mounted on motor vehicles is subjected to substantial shocks and vibrations, especially when the vehicle passes over rough terrain. The problem is still further aggravated in connection with generators since these must rotate at very high speeds and are driven by a pulley and a belt which is normally under substantial tension. For the aforementioned reasons, it is important to mount a generator in a manner which will prevent or minimize the stresses imposed thereon to thereby reduce the probability of breakage or failure of the generator and the housing therefor.

SUMMARY OF THE INVENTION

Accordingly, it is an object of the present invention to provide a generator housing which does not possess the disadvantages which similar prior art housings possess.

Another object of the present invention is to provide a generator housing which is simple in construction and economical to manufacture and which minimizes the stresses imposed thereon during operation of a motor vehicle.

Still another object of the present invention is to provide a housing as described above which can be pivotally mounted about any one of a plurality of longitudinal passages.

A further object of the present invention is to provide a generator housing under discussion which may be utilized with engines rotating at high speeds.

A still further object is to provide a housing for a generator which may be utilized with a motor vehicle and which must be capable of sustaining very high vibrations and shocks.

According to the present invention, a generator, particularly for motor vehicles, comprises a substantially hollow cylindrical housing having an axis usually substantially horizontal when mounted. A stator arrangement is situated in the housing and a shaft extends along the axis and is rotatably mounted in the housing. A rotor is mounted on the shaft for sharing rotary movements of the latter, the housing being provided with at least two longitudinal passages therethrough. The passages have axes substantially parallel to the axis of the housing and are adapted to receive holding means therethrough. According to a presently preferred embodiment, the shaft has a driven end and the housing is a cast cup-shaped member having an open end facing the driven end of the shaft, and further comprising a cast bearing plate for closing the open end of the cup-shaped member. The housing is preferably provided with at least two longitudinal protuberances formed with the passages. These protuberances preferably extend over the entire axial length of the housing and the passages extend through the entire axial length of the protuberances. Alternatively, three passages or protuberances can be provided, spaced angularly 120° relative to each other about the axis of the housing. The bearing plate is formed with openings aligned with the passages, the holding means also passing through these openings.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENT

Figure 1:
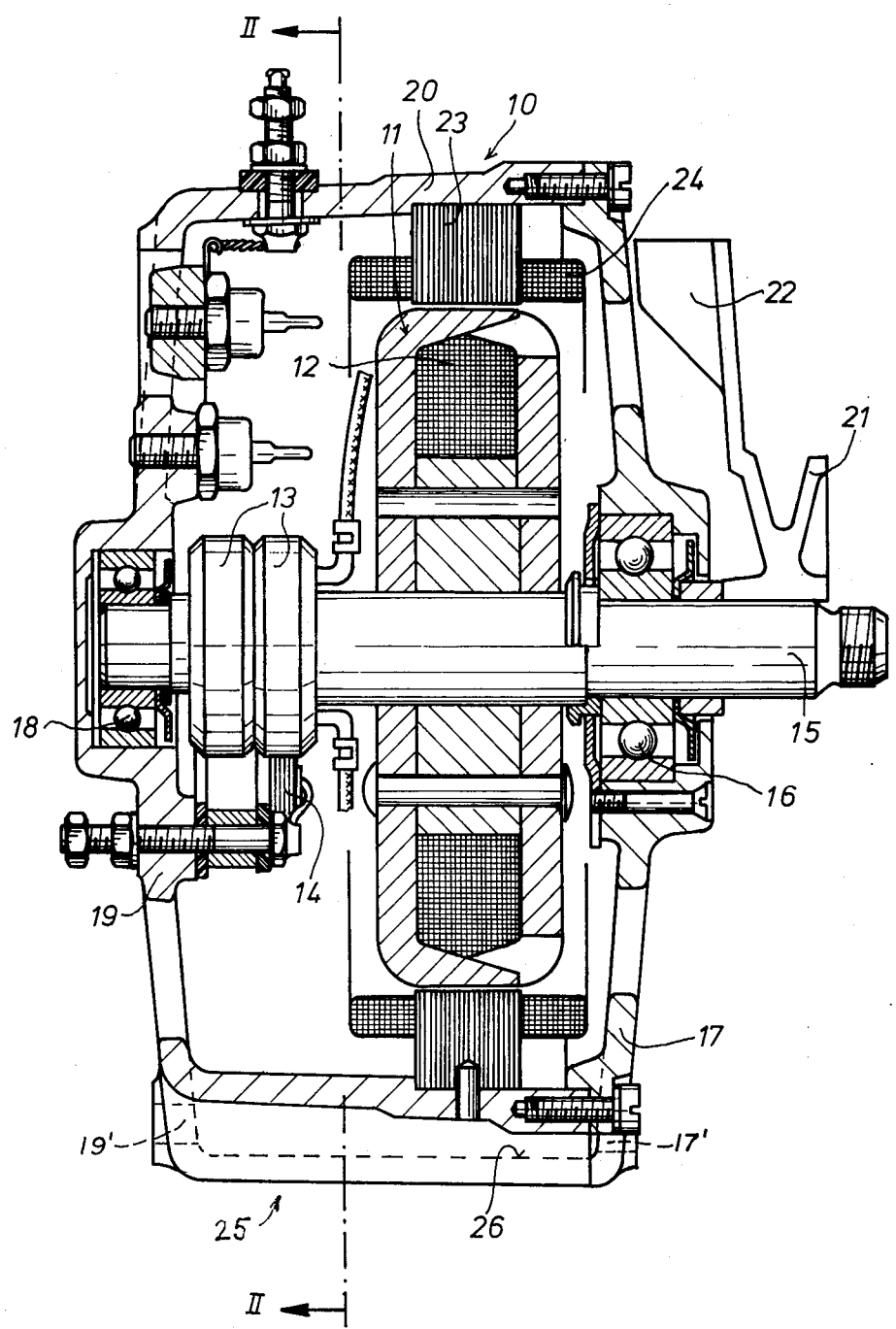
FIG. 1 is a longitudinal cross section of a generator having a housing in accordance with the present invention.

In FIG. 1, a generator 10 is shown in a longitudinal cross-section. The generator as shown is a clawpole generator, although the novel casing or housing may be utilized with other types of motors or generators, as will become clear hereafter. A claw pole rotor 11 with an exciting winding 12 and a current-supplying arrangement consisting of slip rings 13 and brushes 14 are provided in a well-known manner — these elements not forming part of the invention. The rotor is mounted on a shaft 15, which is rotatably mounted in a bearing 16 on a bearing plate 17 on the driven side of the shaft 15 and in a bearing 18 on the slip ring side of the shaft 15. The housing comprises a cup-shaped member having a closing portion 19 configurated as a bearing plate and an intermediate portion 20 which is substantially cylindrical, the open side of the cup-shaped member facing the driven end of the shaft 15. On the driven side of the shaft 15, the bearing plate 17 closes the open side of the cup-shaped member and can be secured to the intermediate portion 20 in any conventional manner (here shown connected by screws). Mounted on the generator shaft 15 is a driving pulley 21 and a fan 22.

The bearing plates 17 and 19 are cast parts — the bearing plate 19 being integral with the intermediate portion 20 in the present embodiment. The cylindrical portion 20 is shrink-fitted onto the stator and connected thereto with pins to prevent displacement of the latter inside the intermediate portion 20.

Figure 2:
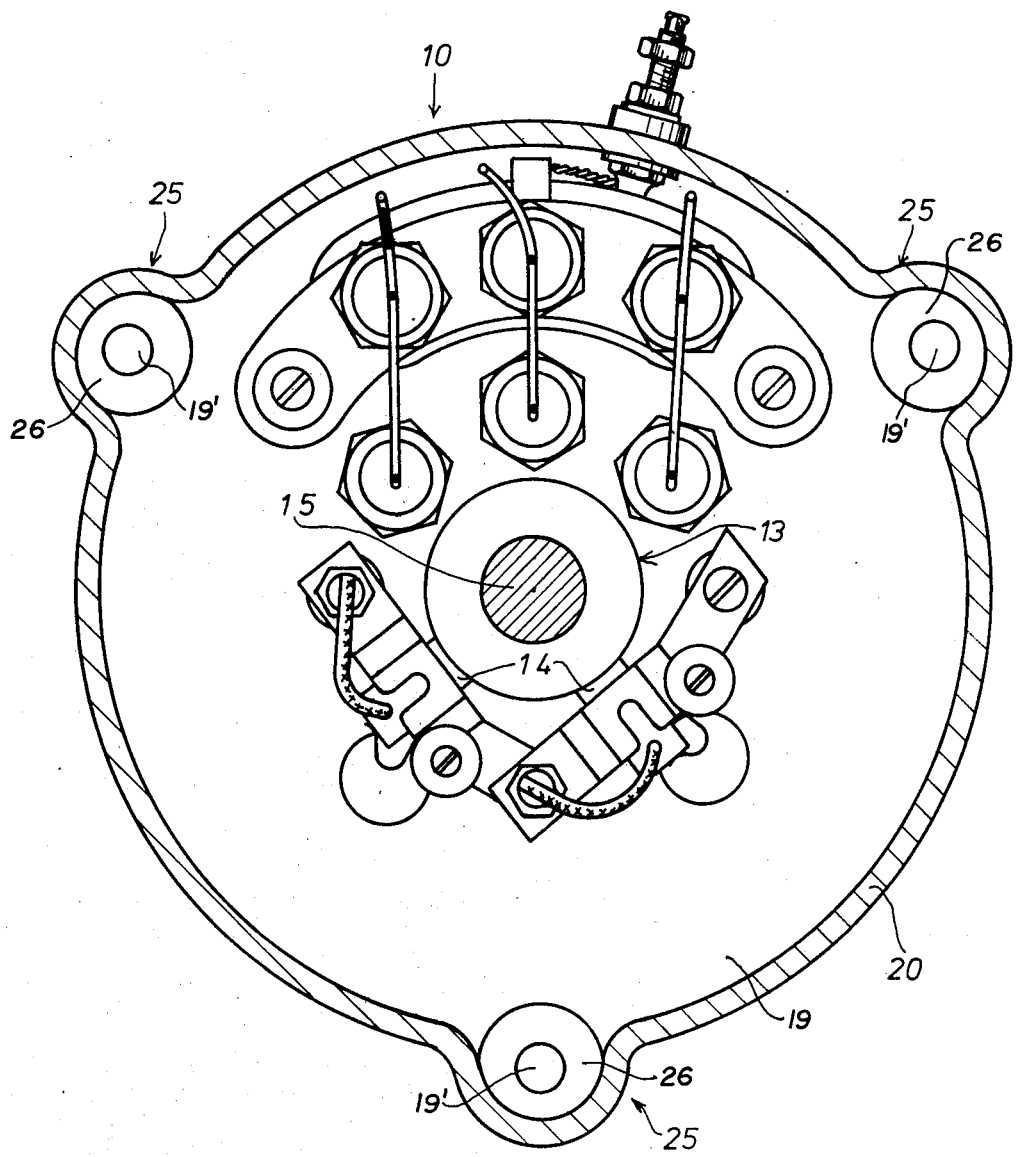
FIG. 2 is a cross-section of the generator shown in FIG. 1, taken at line II—II in FIG. 1.

Referring to both FIGS. 1 and 2, the intermediate portion 20 is provided with three protuberances or bulges 25 extending longitudinally over the entire axial length of the intermediate portions 20. Each protuberance 25 is provided with a longitudinal passage 26 which has an axis substantially parallel to the axis of the shaft 15. The passages 26 may either be open toward the interior of the housing, as illustrated, or provided entirely in the circumferential wall 20 formed with the protuberances 25. The passages 26 may be obtained by drilling through the enlarged protuberances 25 or in any other conventional manner. Of course, if the thickness of the intermediate portion 20 is sufficiently great, then the passages 26 may be drilled directly into the intermediate portion 20 without the necessity of providing the protuberances 25. In any event, the axes of the passages 26 are equally angularly spaced from each other — 120° about the axis of the shaft 15 with three passages in accordance with the presently preferred embodiment.

Because generators are generally driven by a belt drive under tension, it is important to mount the generator in such a manner that it may be pivoted between two positions — one position wherein the belt may be fitted over the driving pulley 21 while not under tension and a second position wherein the belt is under tension as during normal operation. With the embodiment in accordance with the present invention, the generator 10 may be pivoted about the lower passage 26, as seen in FIG. 2. The present housing has the advantage, not known in the prior art, that it may be pivotally mounted about any one of the three passages 26, should one of the passages become damaged or should the respective protuberance fail or crack. Advantageously, the protuberances are so angularly positioned about the axis of the shaft 15 that in any mounted position of the generator a respective passage 26 will lie directly below the center of gravity of the generator. Although it is possible to only provide two passages 26, three passages are preferred for added security and versatility. The bearing plate 17 is formed with through openings 17' which are aligned and communicate with the associated passages 26. Similarly, the integral bearing plate 19 is provided with openings 19'. Holding means, such as through bolts, are passed through each of the passages 26 and openings 17' and 19' and secured to the engine or the frame of the motor vehicle. By positioning a passage 26 directly below the center of gravity of the generator, there exists no moment arm for the force representing the weight of the generator — which force, with such a design, passes directly through the axis of the lower passage 26.

By extending the protuberances 25 and passages 26 along the entire length of the intermediate portion 20, as shown in FIG. 1, the bending stresses applied to a housing are almost totally eliminated. This is especially true when the generator housing is mounted by a suitable longitudinal holding means along at least two and preferably three axial passages 26 about the periphery of the housing.

Instead of extending the passages 26 and the holding means passing therethrough over the entire axial length of the intermediate portion 20, it is also possible to extend the protuberances 25 as well as the passages 26 only over a portion of the axial length — so that said portion lies directly beneath the center of gravity of the generator. Although many of the same advantages are thus achieved — namely the reduction of bending stresses, since the moment arm due to the force representing the weight of the generator still is substantially equal to zero, such construction may not in practice always be desirable. Thus, in practice, placing the holding means directly below the center of gravity presents various construction difficulties. These difficulties arise partly due to the tolerances in mass produced products so that the center of gravity actually may shift axially from generator to generator. To make it possible to work with tolerances which are not so critical, and to thereby decrease the manufacturing costs, it is preferable in accordance with the presently preferred embodiment to extend the protuberances 25, as well as the passages 26 and the holding means (not shown), over the entire axial length of the intermediate portion 20.

With known generators, which include flat projections extending radially outwardly of the circumferential wall at the end of the housing which is close to the support, failure, particularly of the radially extending projections, is not uncommon, particularly because of the stresses acting on the projections during the operation of the motor vehicle due to vibrations or shocks. The provision of the passages for the holding means in such projections, radially spaced from the circumferential wall, aggravates this problem by increasing the stresses. These problems are substantially reduced by the present construction. The described generator is capable of sustaining very high stresses contributed both by the tensioned belt during operation as well as by the accelerative forces encountered during movement of the vehicle over rough terrain — this capability being an important requirement for all generators to be utilized in motor vehicles. The herein disclosed type of generator can withstand substantial vibrations and shocks, and is particularly useful for revolutions in the region of 0 to 1200 rpm. The described novel mounting arrangement for the generator represents an important improvement which increases the lifespan of the generator.

It will be understood that each of the elements described above, or two or more together, may also find a useful application in other types of generator housings differing from the types described above.

While the invention has been illustrated and described as embodied in generator housings having longitudinal passages angularly displaced from each other and extending the entire axial length of the housing for mounting a generator, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

1. In a generator for a motor vehicle, a combination comprising a shaft having a longitudinal axis and being rotatable about the same; a pulley rigidly attached to said shaft for driving the same; a rotor affixed to said shaft so as to rotate with the same; a stator surrounding said rotor; and a housing including a substantially cylindrical circumferential wall surrounding said stator in substantial parallelism with said longitudinal axis and having axially spaced end portions, said circumferential wall being circumferentially bounded by a substantially cylindrical outer surface and a substantially cylindrical inner surface, which surfaces extend over the entire axial length of said circumferential wall, said circumferential wall further having a plurality of openended passages arranged parallel to said longitudinal axis and located entirely within said circumferential wall between said outer surface and said inner surface, said housing further including two axially spaced end walls extending substantially transversely to said longitudinal axis and connected to the respective end portions of said circumferential wall, said end walls having a plurality of openings aligned and merging with the respective passages of said circumferential wall and passing through the respective end walls, said passages and openings being adapted to accommodate holding means for so attaching said housing to the motor vehicle that said holding means extends through the respective ones of said passages in said circumferential wall and respective ones of said openings in said end walls and engages respective parts of said housing so that the housing is pivotable about at least one of said holding means extending through a respective passage and openings but is arrestable in a selected pivoted position by another holding means extending through a different passage and openings, whereby the forces to which said parts of said housing are subjected are reduced, and damage to said parts due to such forces is prevented as a result of the arrangement of said passages within said circumferential wall radially inwardly of said outer surface and radially outwardly of said inner surface, of the location of said openings in said end walls, and of the accommodation of the holding means in said passages and openings.

2. A generator as defined in claim 1, wherein said circumferential wall has a plurality of protuberances extending over the entire axial length of said circumferential wall and also bounded by said outer surface; and wherein said passages are located within said protuberances.

3. A generator as defined in claim 1, wherein said shaft has a driven end and wherein said housing is a cast cup-shaped member including said circumferential wall and one of said end walls and having an open end facing the driven end of said shaft, and wherein the other end wall is a cast bearing plate for closing the open end of said cup-shaped member.

4. A generator as defined in claim 3, wherein the generator is provided with slip rings, and wherein said slip rings are mounted in the region of said cup-shaped member close to said one end wall.

5. A generator as defined in claim 1, wherein three passages are provided and wherein the axes of the latter are angularly displaced from each other by 120° about said longitudinal axis.

6. A generator as defined in claim 1, wherein said stator is fixedly connected to the inside peripheral portion of said circumferential wall.

7. In a generator for a motor vehicle, a combination comprising a shaft having a longitudinal axis and being rotatable about the same; a pulley rigidly attached to said shaft for driving the same; a rotor affixed to said shaft so as to rotate with the same; a stator surrounding said rotor; and a housing including a substantially cylindrical circumferential wall surrounding said stator in substantial parellelism with said longitudinal axis and having axially spaced end portions, said circumferential wall being integrally formed with a plurality of protuberances extending over substantially the entire axial length of said circumferential wall in parallelism with said longitudinal axis, said circumferential wall and said protuberances being circumferentially bounded by an inner surface and an outer surface, which surfaces extend over the entire axial length of said circumferential wall, said circumferential wall further having a plurality of open-ended passages arranged parallel to said longitudinal axis and located entirely in said protuberances between said outer surface and said stator and radially inwardly of said inner surface, said housing further including two axially spaced end walls extending substantially transversely to said longitudinal axis and connected to the respective end portions of said circumferential wall, said end walls having a plurality of openings aligned and merging with the respective passages of said circumferential wall and passing through the respective end walls, said passages and openings being adapted to accommodate holding means for so attaching said housing to the motor vehicle that said holding means extends through the respective ones of said passages in said protuberances, and openings in said end walls and engages respective parts of said housing so that the latter is pivotable about at least one of said holding means extending through a respective passage but is arrestable in a selected pivoted position by another holding means extending through a different passage, whereby the forces to which said parts of said housing are subjected are reduced and damage to said parts due to such forces is prevented as a result of the arrangement of said passages within said protuberances radially inwardly of said outer and inner surfaces, of the location of said openings in said end walls, and of the accommodation of the holding means in said passages and openings.

8. A generator as defined in claim 7, wherein said passages extend through the entire axial length of said protuberances.

9. A generator as defined in claim 7, wherein three protuberances are provided spaced angularly 120° relative to each other about said longitudinal axis.

10. A generator as defined in claim 7, wherein said housing is of cast iron.

* * * * *